US006353177B1

(12) United States Patent
Young

(10) Patent No.: US 6,353,177 B1
(45) Date of Patent: Mar. 5, 2002

(54) VIBRATION RESISTANT OVERHEAD ELECTRICAL CABLE

(75) Inventor: Walter W. Young, Toronto (CA)

(73) Assignee: Nexans Canada Inc., Markham (CA)

( * ) Notice: Subject to any disclaimer, the term of this patent is extended or adjusted under 35 U.S.C. 154(b) by 0 days.

(21) Appl. No.: 08/255,083

(22) Filed: Jun. 7, 1994

(30) Foreign Application Priority Data

Oct. 8, 1993 (CA) ............................................ 2108059

(51) Int. Cl.[7] ................................................ H02G 7/14

(52) U.S. Cl. ................ 174/42; 174/117 R; 174/119 R; 174/120 R; 57/213

(58) Field of Search ................................ 174/42, 128.1, 174/129 R, 84 C, 87, 70 A, 137 R, 117 R, 117 AS, 120 R, 120 SC, 119 R, 133 R, 105 R, 36, 120 C; 57/215, 214, 219

(56) References Cited

U.S. PATENT DOCUMENTS 2,418,192 A * 4/1947 Pierce .................... 174/117 R
3,286,020 A * 11/1966 McLoughlin ....... 174/133 R X
3,659,038 A 4/1972 Shealy ........................ 174/42
3,725,230 A * 4/1973 Bahder et al. ............ 174/36 X
3,992,566 A 11/1976 Kerimov et al. .............. 174/42
4,029,830 A * 6/1977 Yamamoto et al. .. 174/120 C X
4,361,723 A * 11/1982 Hvizd et al. ............ 174/129 R
5,171,942 A 12/1992 Powers ....................... 174/129
5,214,244 A * 5/1993 Cummings et al. .. 174/119 R X
5,418,333 A * 5/1995 Sanders .................. 174/129 R

FOREIGN PATENT DOCUMENTS

CA 1024228 * 2/1974 ............... 174/70 A
FR 0961066 * 5/1950 ............. 174/129 R

* cited by examiner

*Primary Examiner*—Albert W. Paladini
(74) *Attorney, Agent, or Firm*—Ware, Fressola, Van der Sluys & Adolphson LLP

(57) ABSTRACT

A vibration resistant overhead electrical cable is provided, such as a high-voltage transmission line, which has an insulated conductor, the insulation of which has an axially continuously rotating oval or elliptical outer periphery such that the aerodynamic forces acting on the cable act in a continuously changing direction, thereby reducing the tendency of the cable to vibrate. The ratio of the major to minor axis of the oval or elliptical shape is preferably between 1.1 and 1.2 and the length between axial rotations along the longitudinal axis of the cable is usually between about 2.5 and 3.5 meters.

11 Claims, 2 Drawing Sheets

VIBRATION RESISTANT OVERHEAD ELECTRICAL CABLE

This invention relates to insulated or covered vibration resistant overhead electrical cables. More particularly, it relates to a high-voltage transmission line which is resistant to aeolian vibrations and galloping, and which has no dielectric limitations. In addition, it relates to a cable which can be advantageously installed in a high-voltage transmission line designed to have a low electromagnetic field (EMF).

Aeolian and galloping vibrations of overhead, electrical transmission lines are well known. One known manner of reducing such vibrations is to use a plurality of conductors at least one of which is continuously and helically wound about another conductor so as to provide the final cable with a transverse cross-section which is oval or elliptical in shape and which has a continuously varying profile along the cable's length. Such conductors are disclosed, for example, in U.S. Pat. No. 3,659,038 of Apr. 25, 1972 where the phenomenon of aeolian vibration is also discussed and the galloping vibration is mentioned. Normally such cables are "bare" or "air-insulated", although in some cases individual conductors may be insulated.

There are also a number of patents which disclose various damping accessories that are attached or clamped onto the cable in order to eliminate vibrations or reduce their amplitude. One such vibration damper is disclosed in U.S. Pat. No. 3,992,566 dated Nov. 16, 1976, and consists of an elongated plastic plate clamped onto the aerial conductor.

All of these prior art cables have several disadvantages.

The "bare" or uninsulated conductors are not suitable for low EMF use at transmission line voltages of, for example, 69 kV or higher. A typical high voltage transmission line will have several hundred kilovolts, e.g. 230 kV, and spacings between conductors of 7 to 10 meters. With an insulating layer on the conductors, the interphase spacing can be reduced to 1.5–2 meters. This has the effect of a significant reduction in the electromagnetic radiation (EMP), which varies logarithmically with the average conductor spacing. Extremely low frequency electromagnetic fields are generally defined as those electromagnetic fields of less than 300 Hz. and are believed by some researchers to be cancer facilitators, especially in children. Although several recent epidemiological studies have proven inconclusive, biological effects have been demonstrated under both in vivo and in vitro experimental conditions. Because there is no firm link between exposure to low frequency electromagnetic fields and damage to human health, the short term future individual response may be one of prudent avoidance. Utilities will follow this principle by minimizing electromagnetic fields as much as possible.

However, when a number of insulated conductors are wound around each other, there is produced a dielectric disadvantage of having an assembly of conductors operating at high voltage, leading to less equally distributed dielectric stress within the conductor insulation. This unequal stress distribution will be exacerbated where a fault condition occurs involving only one of the assembled conductors, thereby producing a possibility of exceeding acceptable cable design limits.

The various damper attachments do not alleviate the above disadvantages, but rather produce some of their own such as higher installation and maintenance costs and the like.

It is, therefore, an object of the present invention to provide a vibration resistant overhead conductor which will alleviate the above disadvantages and which will be suitable for low-EMF applications.

Another object is to provide a simple and effective high-voltage overhead cable construction which will resist both aeolian and galloping vibrations.

Other objects and advantages of the invention will be apparent from the following description thereof.

In general, this invention provides a vibration resistant overhead electrical cable comprising an insulated conductor in which the insulation has an axially continuously rotating oval or elliptical outer periphery such that the aerodynamic forces acting on the cable act in a continuously changing direction, thereby reducing the tendengy of the cable to vibrate. The invention covers any overhead electrical cable construction provided it has an insulation overcoating a conductor and having the required outer shape and rotation or twist, however, it is particularly suitable for high-voltage transmission lines with low EHF. Normally such cables have a stranded conductor, which may be a conventional round conductor, with a layer of semi-conducting material provided thereover and acting as a conductor shield. Such conductor shields are well known in power cables and they are normally made of a material having electrical properties which are suitable for this purpose. Then, preferably, two layers of insulation are provided on top of the conductor shield, an inner insulating layer and an outer insulating layer. Obviously, if desired, additional insulation layers or other structural elements of the cable could also be provided.

When two layers of insulation are provided as mentioned above, then the inner insulating layer can be made to have essentially the same shape as the conductor, for example, round, whereas the outer insulating layer is made to have the axially continuously rotating oval or elliptical outer periphery. This can be achieved by applying the outer layer either in a separate or in the same manufacturing process so that it would have this desired rotation and an oval or elliptical outer shape. For this purpose, an oval or elliptically shaped extrusion die, which rotates at such a rate as to obtain the desired pitch of rotation or as it is sometimes called "lay", can be advantageously employed.

In some cases it is advantageous to make both the inner insulating layer and the outer insulating layer of oval or elliptical shape. This results in improved dielectric properties of the cable, because, at prevailing operating temperatures, the inner insulation will typically have a lower dielectric constant and be more dielectrically stable than the outer insulating layer.

Moreover, the conductor itself can be made oval or elliptical with a spiralled twist providing the desired longitudinal rotation of the major axis of the cross-sectional shape. On top of such conductor one can apply the layer of semi-conducting material and the desired layers of insulation so that they will all retain the rotating oval or elliptical shape of the conductor and provide the outer periphery of the cable with the desired shape and lay.

Although one can use, in accordance with the present invention, any oval or elliptical geometry of the insulation that will cause, in conjunction with the continuously rotating shape thereof, the wind-induced aerodynamic forces acting on the overhead cable to be in a continuously changing direction, thereby reducing the tendency of the cable to oscillate, it has been determined by experimental analysis that best results are achieved when the oval or elliptical major to minor axis ratio in between 1.1 and 1.2. The length of rotation or lay is usually kept within a range most suitable for manufacturing, however, normally it will be between about 2.5 and 3.5 meters, for example 3 meters.

The outer insulation should normally be made of a material which is weather resistant and also resistant to electrical discharge. It is made of a typically UV—and track-resistant polymer. Such insulating materials are well known in the art of cablemaking.

The invention will now further be described with reference to the appended drawings, in which.

Figure 1:
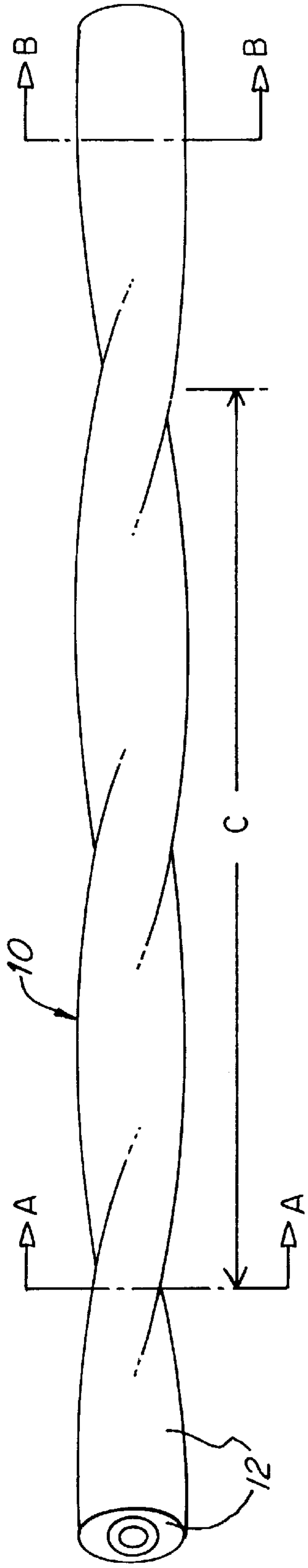
FIG. 1 is a fragmentary perspective—side view of a general non-limitative embodiment of the novel cable.

As illustrated in FIG. 1, an insulated electrical cable 10 is provided, the insulation 12 of which has an oval or elliptical outer periphery and is continuously axially rotated over its length. The lay or distance c between rotations is not limitative but is usually between about 2.5 and 3.5 meters, depending on the size of the cable and its manner of manufacture.

Figure 3:
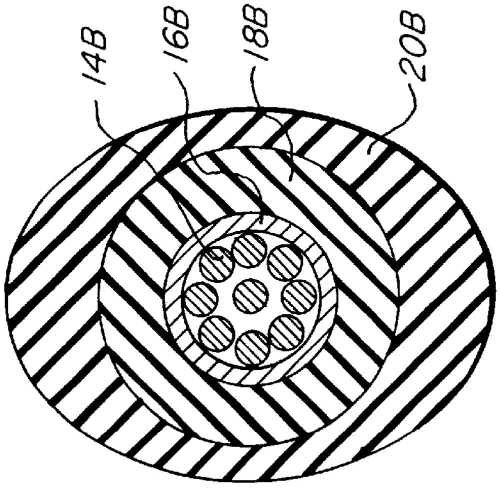
FIG. 3 is a cross-section view of the same embodiment of the cable as in FIG. 2, but along section line B—B shown in FIG. 1.
Figure 2:
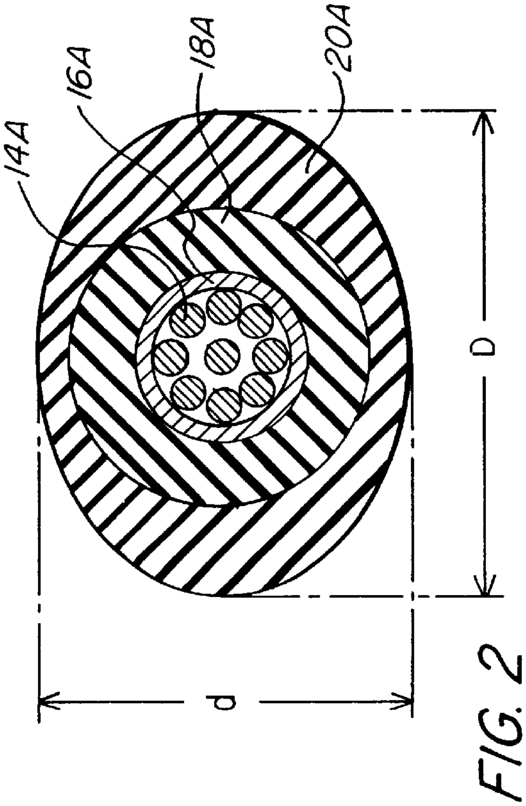
FIG. 2 is a cross-section view of a more specific embodiment of the novel cable along section line A—A shown in FIG. 1.

A more specific embodiment of the cable is illustrated in FIG. 2 and FIG. 3 where FIG. 2 represents a cross-sectional view along line A—A and FIG. 3 a cross-sectional view along line B—B of FIG. 1. The same reference numbers are used to represent the same elements in FIG. 2 and FIG. 3, however, in FIG. 2 they are followed by letter A and in FIG. 3 by letter B. Thus, the cable shown in FIG. 2, which is in its horizontal oval or elliptical position, has a round, stranded conductor 14A, which is covered with conductor shield 16A made of a semi-conducting material and has an inner insulating layer 18A also of round cross-section. Over this insulating layer 18A there is provided an outer insulating layer 20A which has the oval or elliptical cross-section in accordance with the present invention. The preferred ratio of the major axis D to the minor axis d, shown in FIG. 2, namely D/d=1.1 to 1.2.

In FIG. 3 the same cable as in FIG. 2 is shown but in its vertical oval or elliptical position. This cable has again a round stranded conductor 14B covered with conductor shield 16B and a round, inner insulating layer 18B and finally an outer oval or elliptical insulating layer 20B. The outer insulating layer 20A, 20B is normally made up of a material which is weather and electric discharge resistant.

Figure 4:
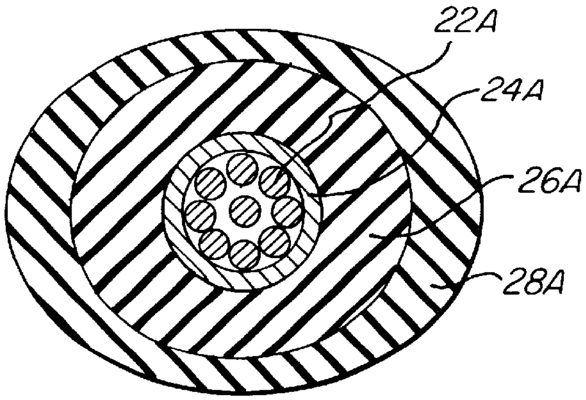
FIG. 4 is a cross-section view of another embodiment of the novel cable along section line A—A shown in FIG. 1.
Figure 5:
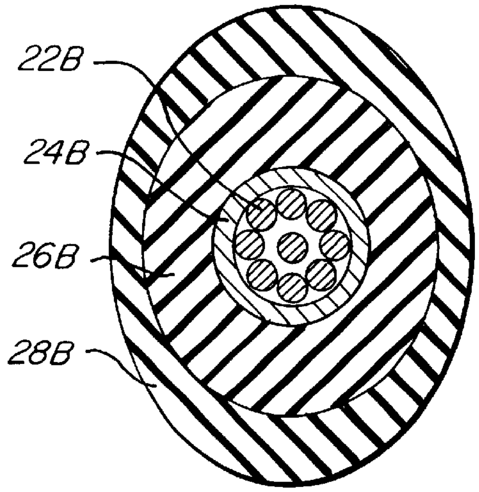
FIG. 5 is a cross-section view of the same embodiment of the cable as in FIG. 4, but along section line B—B shown in FIG. 1.

FIG. 4 and FIG. 5 illustrate another embodiment of a cable in accordance with the present invention shown in the horizontal and vertical oval or elliptical positions, along section lines A—A and B—B of FIG. 1 respectively. Again the same reference numerals followed by letters A and B are used to designate the same parts of the cable. Thus, in FIG. 4 there is again provided a round, stranded conductor 22A similar to 14A of FIG. 2 covered with a round conductor shield 24A again made of a semi-conducting material as mentioned earlier. An oval or elliptical inner insulating layer 26A is provided over shield 24A and another oval or elliptical insulating layer 28A is provided over the first layer 26A. The oval shape of the inner and the outer insulating layers need not be the same. FIG. 5 shows the same elements in the vertical oval or elliptical position, namely the round, stranded conductor 22B covered with a round conductor shield 24B over which there is provided an oval inner insulating layer 26B and finally the oval or elliptical outer insulating layer 28B which has the desired outer periphery.

Figure 6:
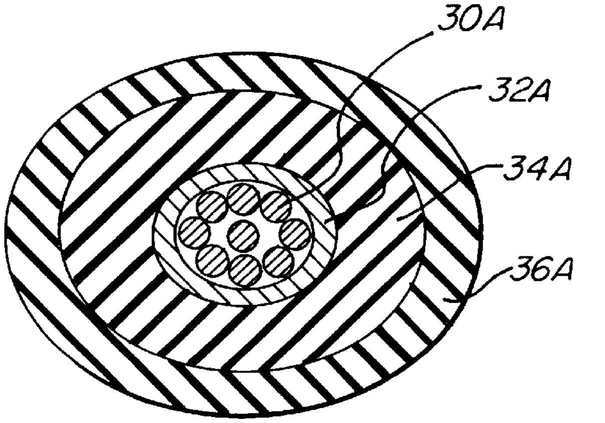
FIG. 6 is a cross-section view of a still further embodiment of the novel cable along section line A—A shown in FIG. 1.
Figure 7:
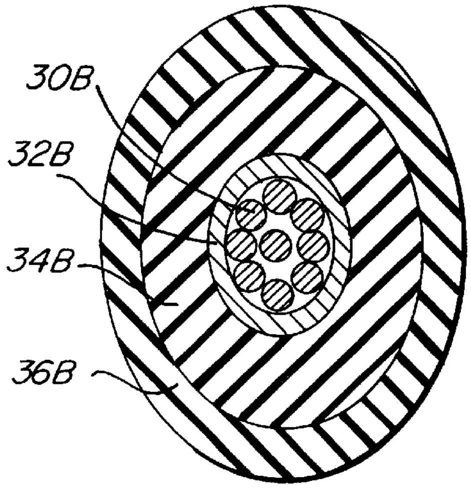
FIG. 7 is a cross-section view of the same embodiment of the cable as in FIG. 6, but along line B—B shown in FIG. 1.

Finally, in FIG. 6 and FIG. 7 another embodiment of the present invention is illustrated. Again these figures show a cross-section of the same cable cut along lines A—A and B—B of FIG. 1 respectively and again the parts are identified by the same numerals followed by letter A in FIG. 6 and letter B in FIG. 7. In this embodiment the stranded conductor 30A, 30B is oval or elliptical in shape and is provided with the spiral twist or rotation over its length so that in its horizontal position it is as shown by 30A in FIG. 6 and in its vertical position as shown by 30B in FIG. 7. The layer of semi-conducting material 32A, 32B covers the conductor 30A, 30B and is of essentially the same oval or elliptical shape and also retains the twist of the conductor. The inner insulating layer 32A, 32B is again of a similar oval or elliptical shape and also retains the twist of the conductor 30A, 30B, and finally the outer insulating layer is again of a similar oval or elliptical shape and again retains the twist of the conductor 30A, 30B.

The cable constructions shown in the above embodiments represent examples of the novel vibration resistant overhead electrical cables of the present invention, which are usually high voltage cables, e.g. 69 kV and higher. They may have various size s and dimensions and may be provided with additional elements or layers if some special properties are required. The outer insulation is usually made of weather and electrical discharge resistant material, e.g. resistant to UV rays and the like. Thus, this invention is not limited by the specific embodiments described and illustrated herein and various modifications obvious to a person skilled in the art of cablemaking can be made without departing from the spirit of this invention and the scope of the following claims.

What is claimed is:

1. A vibration resistant overhead electrical cable suitable for use as a high voltage transmission line with low electromagnetic field, which comprises a conductor having insulation thereon to reduce the electromagnetic field of the cable, the insulation has an axially continuously rotating oval or elliptical outer periphery which provides an outer periphery of the cable such that the aerodynamic forces acting on the outer periphery of the cable act in a continuously changing direction, thereby reducing the tendency of the cable to undergo aeolian and galloping vibrations.

2. Cable according to claim 1, wherein a layer of semi-conducting material is provided around the conductor to form a conductor shield and the insulation is provided over said layer of semi-conducting material.

3. Cable according to claim 2, wherein the insulation comprises two layers, an inner insulating layer and an outer insulating layer, with at least the outer insulating layer having the axially continuously rotating oval or elliptical outer periphery.

4. Cable according to claim 3, wherein the inner insulating layer has essentially the same outer shape as the conductor.

5. Cable according to claim 3, wherein the conductor is a round, stranded conductor and both the inner insulating layer and the outer insulating layer are oval or elliptical, with the outer insulating layer having the axially continuously rotating periphery.

6. Cable according to claim 3, wherein the conductor is an oval or elliptical, stranded conductor with a spiral, axial twist which is transmitted to the layer of semi-conducting material and the layers of insulation, including the outer insulating layer which thereby is provided with the axially continuously rotating oval or elliptical outer periphery.

7. Cable according to claim 3, in which the outer insulating layer is made of a material which is weather and electrical discharge resistant.

8. Cable according to claim 1, wherein the conductor is a round, stranded conductor.

9. Cable according to claim 1, in which the ratio of the major to minor axis of the oval or elliptical shape is between 1.1 and 1.2.

10. Cable according to claim 1, in which the length between axial rotations of the cable along its longitudinal axis is between about 2.5 and 3.5 meters.

11. Cable according to claim 1, wherein the cable is capable of a high voltage transmission of at least 69 kV.

* * * * *